Patented July 5, 1932

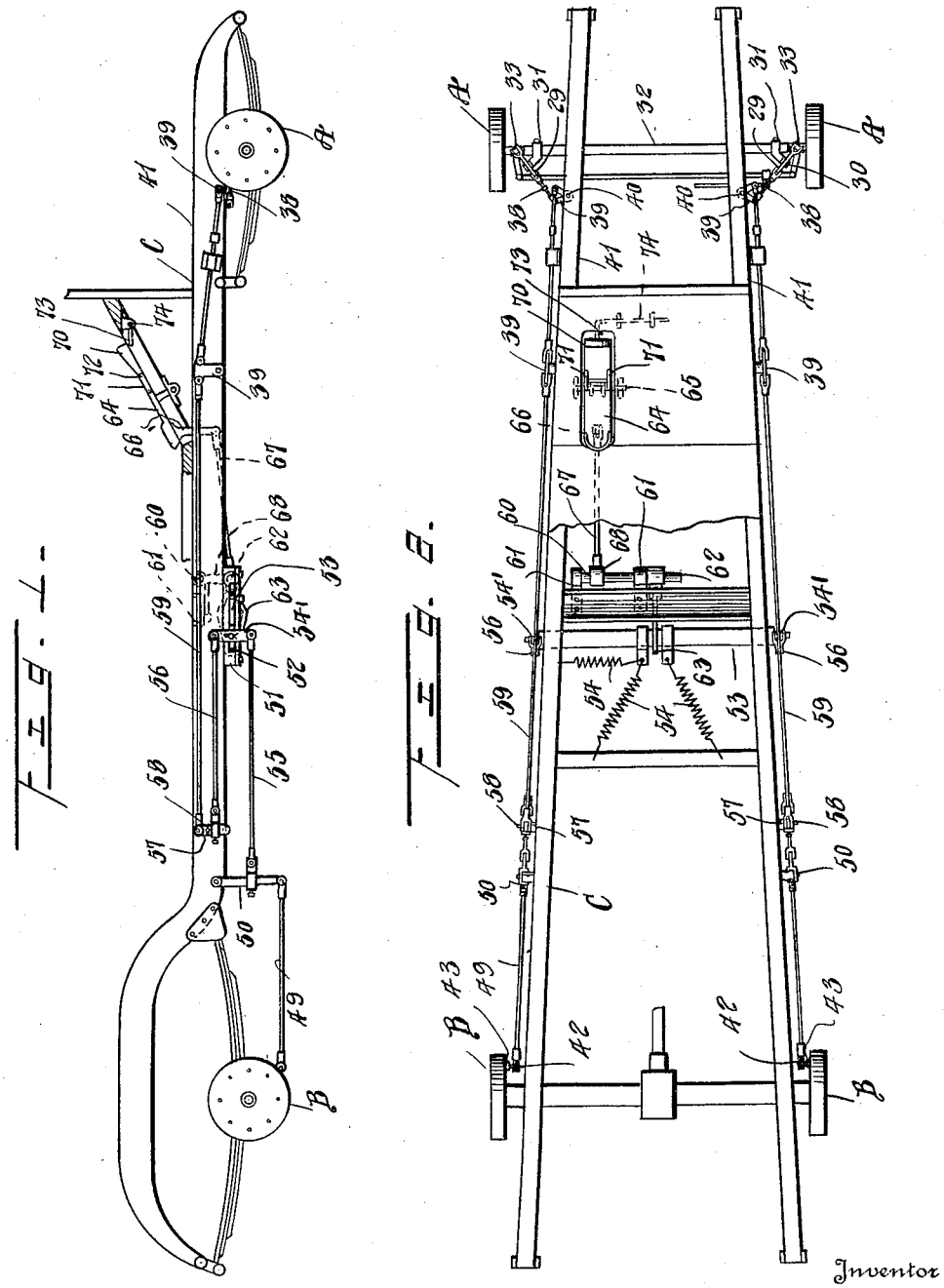

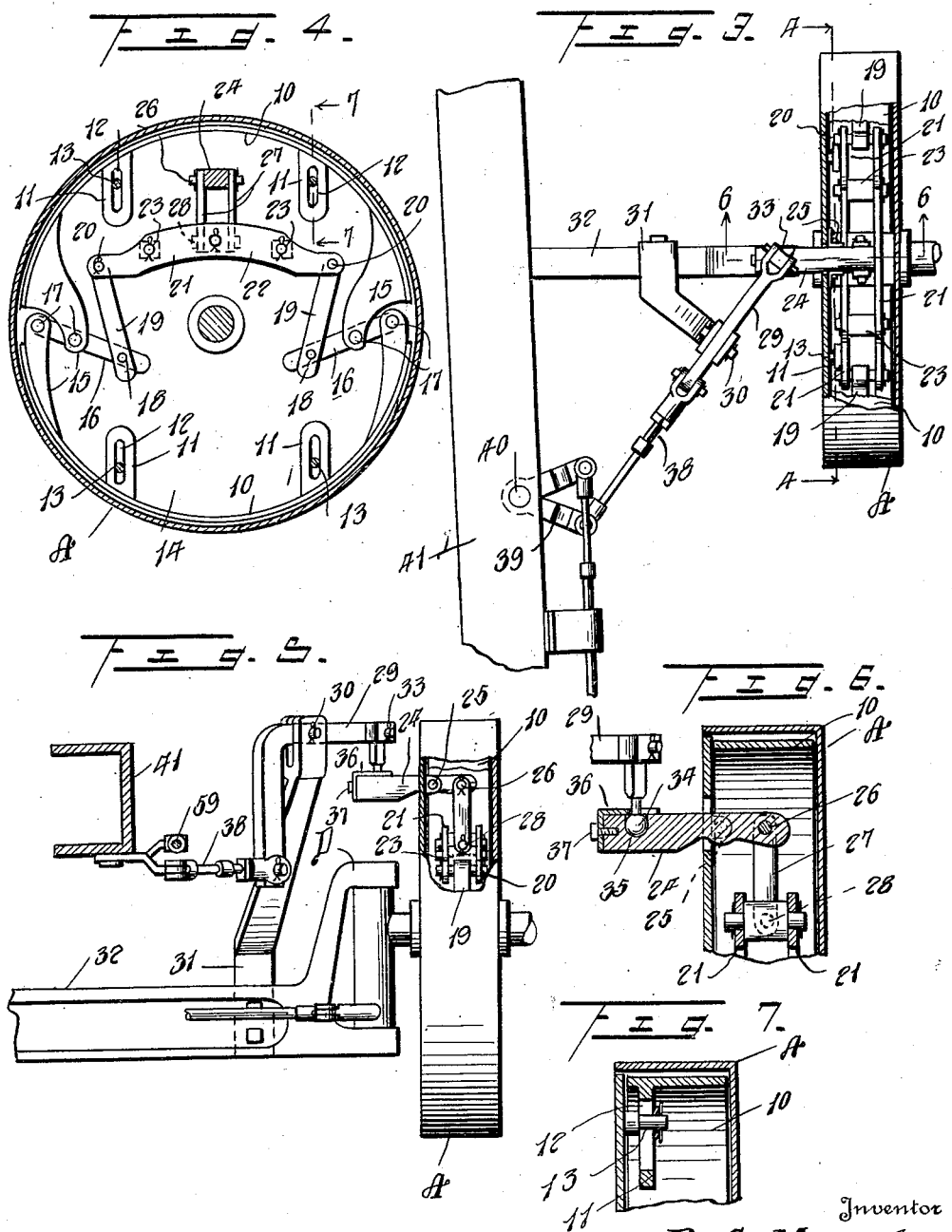

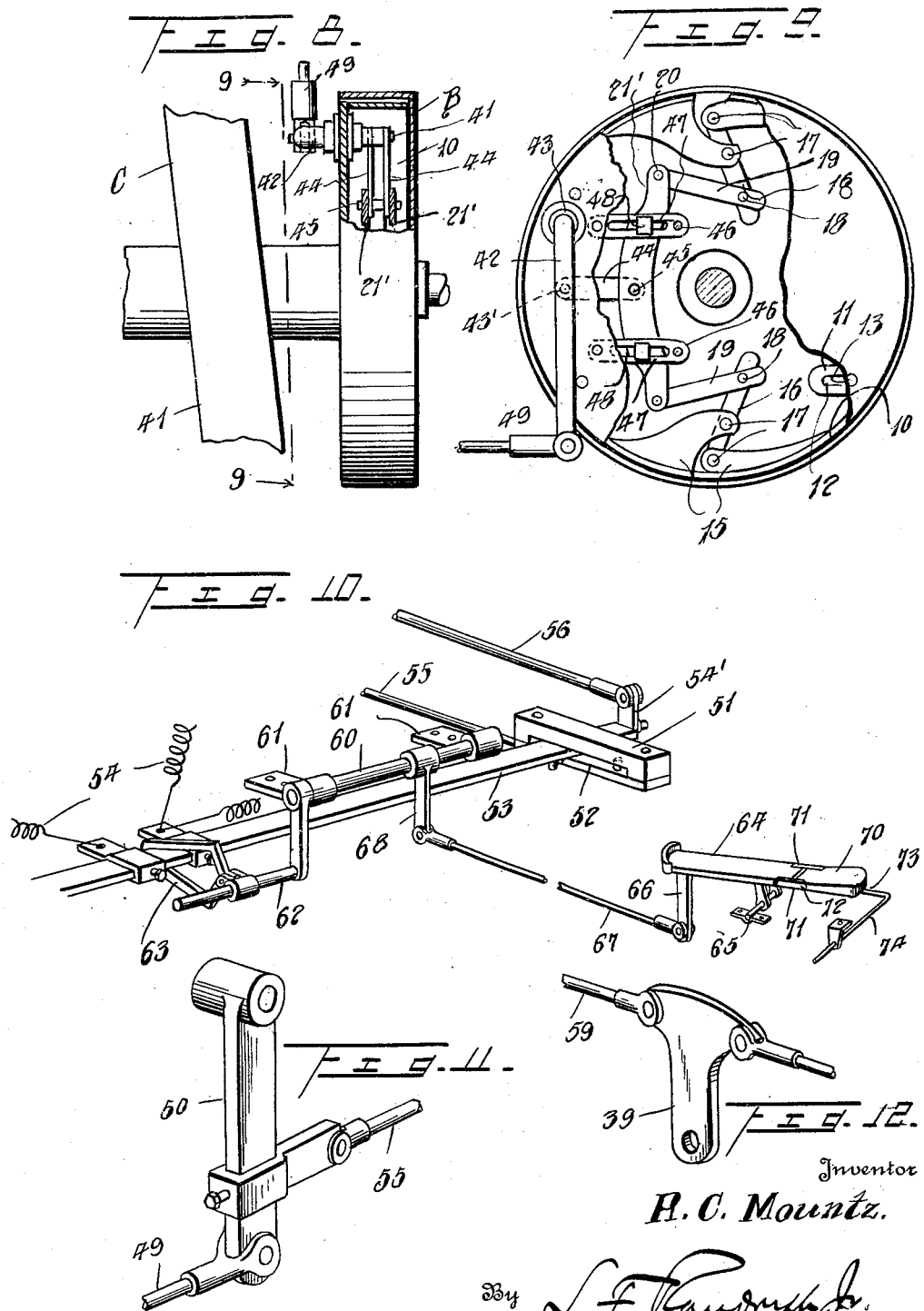

1,866,479

UNITED STATES PATENT OFFICE

RAY C. MOUNTZ, OF ALTOONA, PENNSYLVANIA

FOUR WHEEL BRAKE MECHANISM

Application filed July 11, 1929. Serial No. 377,452.

This invention relates to a four wheel brake mechanism and constitutes an improvement of the construction disclosed in my pending application for Letters Patent covering the four wheel brake mechanism, Serial No. 365,120.

It is aimed to provide a construction wherein an exceedingly efficient type of brake per se is used and of such construction that it may be applied both to the front and the rear wheels, and a construction which is positive, exceedingly durable and capable of installation at minimum cost.

Another object of the invention is to provide a novel construction of pedal or lever which may serve the purpose of controlling operation of the brake and as well the operation of the throttle of the engine or accelerator thereof.

The more specific objects and advantages will in part be pointed out and otherwise become apparent from a consideration of the description following taken in connection with the accompanying drawings illustrating an operative embodiment.

In said drawings:—

Figure 1 is a side elevation, partly broken away, to show the improved brake mechanism, Figure 2 is a plan view of the parts of Figure 1, Figure 3 is an enlarged fragmentary plan view, partly broken away to disclose details, showing the brake mechanism as applied to one of the front wheels of the vehicle.

Figure 4 is a sectional view taken on the line 4—4 of Figure 3,

Figure 5 is a front elevation, partly broken away, of the parts shown in Figure 3, Figure 6 is a detail sectional view taken on the line 6—6 of Figure 3, Figure 7 is a detail sectional view taken on the line 7—7 of Figure 4, Figure 8 is a fragmentary plan view, partly in section, illustrating the improvements applied to a rear wheel of the vehicle, Figure 9 is a view taken substantially on the line 9—9 of Figure 8, but being partly broken away, Figure 10 is a detail perspective view showing the improved pedal and the equalizer control mechanism for the brake, Figure 11 is a detail perspective view of one of the crank connections, and Figure 12 is a detail perspective view of one of the link connections.

Referring specifically to the drawings, the brake drums of the front wheels of a vehicle are suggested at A and the corresponding drums for the rear wheels of such vehicle are shown at B. The chassis of the vehicle is suggested generally at C. The knuckles for the front wheels are shown at D.

Within drums A and B, identical brakes are used. In this connection, each brake has two arcuate shoes 10, each being substantially a semi-circle, preferably flexible, and provided with brake lining or devoid of such lining, as preferred, the shoes 10 being adapted for engagement with the drums A and B or other parts rotated by the wheels.

The shoes 10 have guide lugs 11 extending inwardly therefrom and each provided with elongated slots 12 in which bolts or studs 13 are arranged, the latter being carried by the fixed drums or disks 14 which coact with the movable drums A and B in the usual manner. Each terminal of the shoes 10 has an ear 15 thereon to which levers 16 are pivoted at 17. Such levers 16 in turn at 18 are pivoted to links 19, pivoted at 20 to cross heads 21 in the case of the front wheel brakes and to cross heads 21' in the case of the rear wheel brakes.

The cross heads 21 are adapted to be raised and the cross heads 21' are adapted to be moved longitudinally, thereby moving the links 19 and levers 16, the latter forcing shoes 10 outwardly and tending to expand them and cause them to grip the respective brake drums. The cross heads 21 and 21' comprise spaced bars 22 engaging opposite sides of the links 19 and effectively held in spaced relation by detachable spacing blocks 23.

In order to actuate the cross heads 21 of the front wheels, levers 24 (Figures 5 and 6) extend through stationary drums and are pivoted thereto at 25, and at their inner ends have pivotal connection at 26 with links 27 pivoted to swivel blocks 28 in turn pivoted to the cross heads 21. Actuating levers 29 for the levers 24 are pivoted as at 30 to brackets 31 rigidly fastened to the front axle 32 of the automobile. Posts 33 are swiveled or pivoted to the levers 29 and have balls 34 which are swiveled in sockets 35 provided in the levers 24, the balls 34 being maintained in their sockets by keepers 36 fastened to the levers 24 as by screws 37. A cable or flexible connection 38 extends from the levers 29 to a bell crank lever 39 pivoted at 40 to one of the side beams 41 of the chassis or frame C.

For actuation of the cross heads 21' for the rear wheels, levers 42 are pivoted at their upper ends at 43 to the adjacent fixed drums or disks of the rear wheels. Links or arms 44 pivoted at 43' to levers 42 are located within the brake drums and pivoted at 45 to the cross heads 21'. Guide links 46 are fastened to the fixed disks and have elongated slots 47 in which guide studs 48 on the cross heads 21' move. Lever 42 has a link 49 pivoted thereto which in turn is pivoted to an arm or lever 50 pivoted to one of the side beams of chassis C.

Appropriate operating and connecting means for the arms or levers 29 is provided, substantially similar to that disclosed in my pending application aforesaid. To this end, the chassis C has brackets 51 fastened thereto providing elongated slots 52 in which a bar 53 is adapted for sliding movement, normally being in rearmost position and held and urged to that position by coil springs 54. At opposite sides of the bar 53, cranks 54' are pivotally connected, and linkage 55 is pivotally connected to the cranks 54' and pivotally and adjustably connected to the arms 50. Said cranks 54' also have linkage 56 pivoted thereto and pivoted and adjustably connected to levers 57 pivoted at 58 to the adjacent side beams of the chassis and from which linkage 59 pivotally connected thereto, extends and is pivotally connected to the levers 39.

Adjacent the bar 53, a rock shaft 60 is journaled in bearings 61 appropriately fastened to the chassis C, the shaft 60 having a crank 62 carrying a relatively large loop 63 for actuating the bar 53 and which surrounds such bar.

The service pedal of the automobile is suggested at 64, being a lever pivotally connected on a mounting rod 65 and having a depending arm 66 to which a link 67 is pivoted and which in turn is pivoted to a crank 68 rigid with the shaft 60. It will thus be seen that movement of the pedal 64 downwardly will result in forward movement of the loop 63 in order to actuate the bar 53 to apply the brakes.

Attention is called to the fact that the post 33 is disposed directly in line with the axis of the knuckles D.

Pivoted to the foot pedal 64 at the forward end thereof, is an auxiliary pedal or lever 70, pivoted to the former by means of links 71 and pivot 72. The lever 70 is adapted for engagement with a crank or offset 73 of an actuating rod 74 for the throttle valve connected with the automobile. A spring 75 may be associated with the lever 70 in order to normally hold it out of engagement with the crank 73.

By reason of the construction described, it will be realized that the foot may be maintained on the brake pedal 64 and when the brakes are to be applied, such lever 64 depressed by means of the heel, moving forwardly and downwardly and while the throttle is to be operated, the foot is moved forwardly and pressed downwardly so as to move the forward end of the lever 70 downwardly into engagement with the crank 73 thus shifting the latter. The two levers 64 and 70 are thus combined in a very compact arrangement and in such manner that different movements operate them in such a manner that one movement does not interfere with the other.

Various changes may be resorted to provided they fall within the spirit and scope of the invention.

I claim as my invention:—

In combination, a lever, the pivot of said lever being located intermediate the ends thereof, braking mechanism, means positively connecting said lever to said braking mechanism, a lever pivoted to the forward end of the first lever and in effect constituting an extension thereof, spring means normally maintaining the second lever in alinement with the first lever and against movement independently of the first lever, the first lever being adapted for normal operation through rocking of the foot, said second lever being operable by pressure of the toe, and mechanism unconnected to the second lever and arranged adjacent to the same for operation thereby to actuate a throttle.

In testimony whereof I affix my signature.

RAY C. MOUNTZ.